United States Patent [19]
Nakano

[11] Patent Number: 5,842,065
[45] Date of Patent: Nov. 24, 1998

[54] MIRROR OPERATING DEVICE FOR A SINGLE LENS REFLEX CAMERA WHICH MAXIMIZES AN IMAGE STABILITY TIME PERIOD

[75] Inventor: Yoshiyuki Nakano, Tokyo, Japan

[73] Assignee: Nikon Corporation, Tokyo, Japan

[21] Appl. No.: 789,664

[22] Filed: Jan. 27, 1997

[30] Foreign Application Priority Data

Jan. 26, 1996 [JP] Japan .................................. 8-011810

[51] Int. Cl.⁶ .................................................. G03B 19/12
[52] U.S. Cl. .......................................................... 396/358
[58] Field of Search ............................ 396/48, 358, 213, 396/354

[56] References Cited

U.S. PATENT DOCUMENTS 4,339,189  7/1982  Nakano .

Primary Examiner—W. B. Perkey

[57] ABSTRACT

A mirror operating device for speeding up a photographic operation cycle in a camera having a reflecting mirror for viewfinder observation. The reflecting mirror is movable between a first position blocking a photographic optical path and a second position aside from the photographic optical path. An electromotive drive source moves the reflecting mirror to the first position from the second position after an exposure to view a subject in a viewfinder. The time required for performing a mirror lowering operation is improved by controlling operation of a shutter mechanism and the electromotive drive source to move the reflecting mirror according to specific timing operations. The opening of the shutter mechanism is controlled according to a signal from a first delay device, and the start of the electromotive drive source to drive the mirror is started in response to a signal from a second delay device. The signals from the first delay device and the second delay device are output with respect to a reference signal such that the electromotive drive source starts moving the mirror before the shutter mechanism is finished closing, at a time that the reflecting mirror substantially does not obstruct the photographic optical path until the closing of the shutter mechanism finishes.

16 Claims, 3 Drawing Sheets

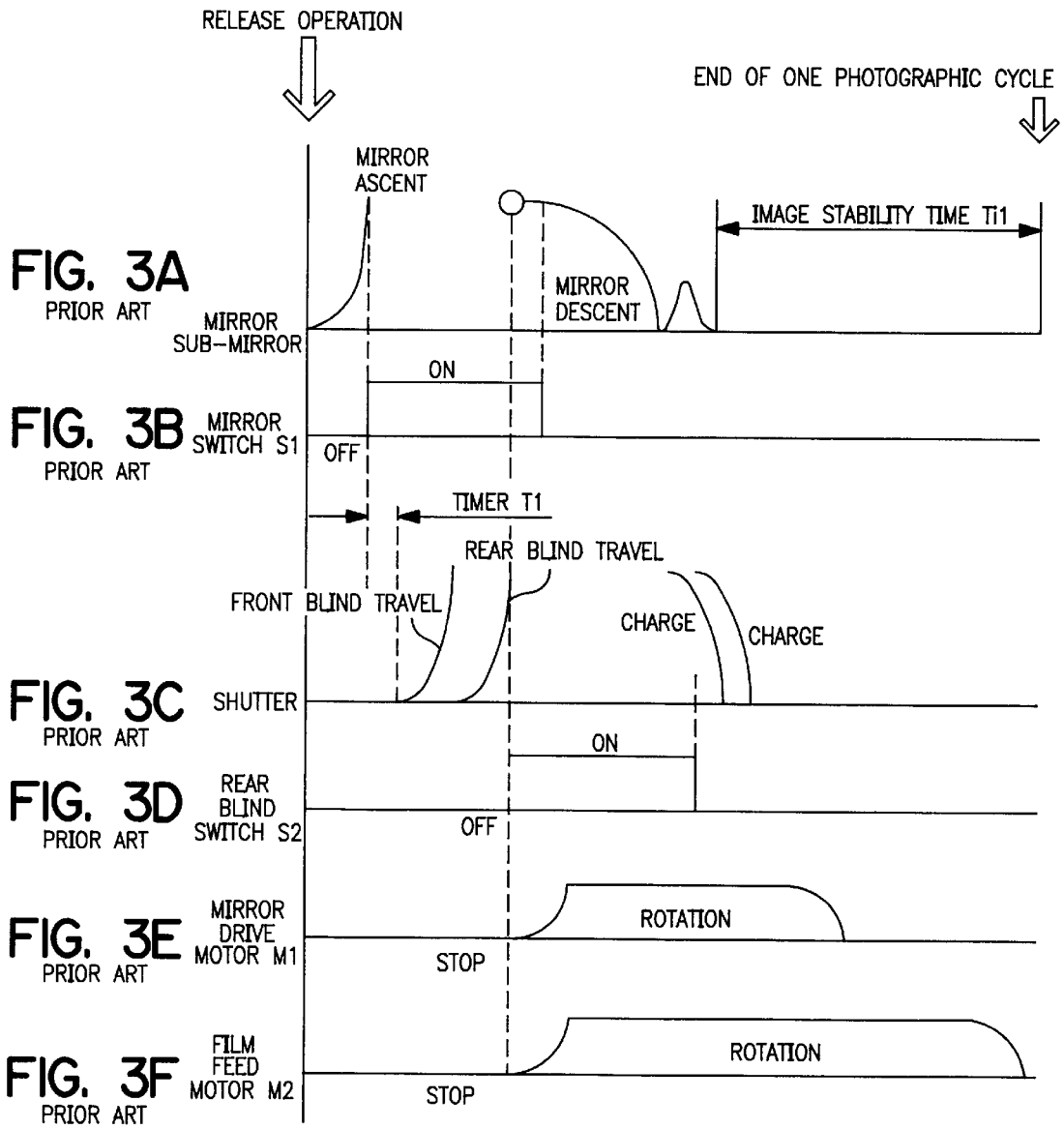

MIRROR OPERATING DEVICE FOR A SINGLE LENS REFLEX CAMERA WHICH MAXIMIZES AN IMAGE STABILITY TIME PERIOD

CROSS REFERENCE TO RELATED APPLICATIONS

This application is based upon and claims priority from Japanese Patent Application No. 8-011810 filed Jan. 26, 1996, the contents of which is incorporated herein by reference.

BACKGROUND OF THE INVENTION

1. Field of the Invention

The present invention relates to a single lens reflex camera having a mirror operating device, known as a quick return mirror mechanism, and, more particularly, the present invention relates to a camera having a mirror operating device which maximizes an image stability time for observation or rangefinding of a subject.

2. Description of the Related Art

Electromotive actuators, such as electric motors, electromagnetic devices and the like electromotive actuators are conventionally used to drive various camera mechanisms in cameras ranging from compact cameras to single lens reflex cameras. For example, electromotive actuators are used in single lens reflex cameras to drive a reflecting mirror of a viewfinder optical system. In its original state, the reflecting mirror blocks the photographic light path, and springs upward accompanying the shutter release operation away from the photographic light path. After the shutter returns to its original state, the reflecting mirror is also returned to its original state. Various mirror operating devices which perform driving of the reflecting mirror with an electromotive actuator are known, for example, as disclosed in Japanese Laid Open Patent Application JP-A-57-192938.

FIGS. 3A–3F are timing diagrams showing an example of a conventional operation of driving a reflecting mirror with an electromotive actuator at the time of photography. More specifically, FIGS. 3A–3F are timing diagrams showing the relationship between the motion of the reflecting mirror, a mirror switch S1, a shutter mechanism, a rear blind switch S2, a mirror drive motor M1, and a film feed motor M2 during one photographic cycle.

Referring to FIGS. 3A–3F, the operating sequence performed at the time of photography is described below. The reflecting mirror is originally placed in a state blocking the photographic optical path, and when a release operation is performed by a release device (not shown in the figure) the reflecting mirror operation commences (FIG. 3A). Before the operation of the reflecting mirror or simultaneously with the operation of the reflecting mirror, an aperture mechanism (not shown in the drawing) is operated to set the desired lens aperture value.

Moreover, in a single lens reflex camera, a sub-mirror is set up on the rear side of the reflecting mirror to obtain an optical path during the performance of rangefinding or photometry. The sub-mirror is raised and lowered about simultaneously with the reflecting mirror, and should be considered included with the reflecting mirror in the following description.

As shown in FIG. 3B, a mirror switch S1 is set ON accompanying the operation of the reflecting mirror, after the reflecting mirror has moved aside to some degree from the photographic optical path. Further, a timer (not shown in the drawing) is started at the time the mirror switch S1 is set ON to time a delay time T1. When the reflecting mirror has moved aside from the photographic optical path by a sufficient amount, or when the mirror raising operation ends and the rebound of the mirror has settled down, the operation of the timer timing the delay time T1 ends. At the end of the delay time T1, the shutter mechanism is actuated by an electromagnetic device or the like electromotive actuator (FIG. 3C). In a focal plane shutter, for example, the front blind begins to open at the end of delay time T1. A closing operation of a rear blind of the shutter mechanism is then performed, according to exposure conditions which are preset automatically or manually, to close the shutter at: a predetermined shutter speed.

As shown in FIG. 3D, at about the same time that the rear blind of the shutter mechanism finishes closing the rear blind switch S2 is set ON. The mirror drive motor M1 then begins to drive the reflecting mirror to its original lowered position (FIG. 3E) to return the reflecting mirror to the position blocking the photographic optical path for observation of the subject. Moreover, in this example, the shutter mechanism is charged by the same mirror drive motor M1.

As shown in FIG. 3F, the film is driven by the film feed motor M2 in response to the rear shutter blind switch S2 being set ON. Furthermore, the mirror drive motor M1 and the film feed motor M2 are stopped according to the signals of suitable operation end detection switches which are respectively disposed to detect the end of a mirror drive and film feed operations.

Performing the above-described photographic operations, and preparation for the next photographic operation constitutes one photographic cycle. However, when performing rapid photography, it is desirable to shorten the photographic cycle time. Specifically, it is desirable to shorten the time required for performing photography and preparing for photography to improve performance when taking numerous photographs within a fixed time, or when instantaneously ending preparatory operations after photography.

To achieve the requirement of shortening the time needed per cycle of performing photography and preparation for photography, it is necessary that the electric motors used for the mirror driving and film feed have a large output. Furthermore, the capacity of the power supply has to be correspondingly large.

However, two problems arise in the conventional mirror operating device which must be solved to improve rapid photography. The first problem is that an image stability time Ti1 is too short (see FIG. 3A). Specifically, if the absolute time during which the mirror is stationary in the observation position blocking the photographic optical path (i.e., the image stability time) is insufficient, the subject is not stable in the viewfinder and can not be adequately observed.

The second problem is that of autofocus time. In particular, in single lens reflex cameras, the reflecting mirror in the optical system of a rangefinding device for an autofocus system (hereinbelow referred to as "AF device") is generally a semi-transparent mirror. By mounting a second mirror, referred to as a sub-mirror, on a rear surface side of the reflecting mirror, a portion of the photographic optical path is reflected in the lower direction of the camera. However, because the second mirror is axially supported on the first mirror side, both the viewfinder observation time and, similarly, the time for which the first and second mirrors are static in the rangefinding position, are insufficient. As a result, the AF device is delayed in commencement of rangefinding, and the time to subsequently perform the required calculations and lens driving is insufficient.

Furthermore, for example, in the course of performing continuous photography, it is also difficult for the autofocus operation to be performed following changes in the distance to the subject. More particularly, referring to FIG. 3A, since observation or rangefinding of the subject commences after the elapse of the time necessary for the reflecting mirror to descend and for the rebound of the mirror to settle down, the image stability time Ti1, during which the image of the subject is observed, becomes short.

However, in accordance with the conventional mirror operating device, because the return action of the mirror is performed upon detecting the closing action of the shutter mechanism via the rear blind switch S2, it is difficult to shorten the time required for one photographic cycle, while sufficiently increasing the image stability time.

The source of this problem resides in the rise time of the electric motor M1 being inferior during the lowering operation of the mirror due to the time constant of the electric motor M1 and the play in the mechanisms involved in lowering the mirror. Thus, even though current flows in the electric motor, the mirror itself does not immediately move.

Moreover, during the mirror descent time, the rebound of the mirror repeats for some time due to the impact and recoil as the mirror settles to a fixed position at which it is supported. The position of the mirror is unstable until the rebound has sufficiently attenuated. As described above, during the rebounding of the mirror, rangefinding or observation can not be used.

With respect to the problem of the mirror not immediately moving, it is difficult to increase the rise time of an electromotive actuator which drives the mirror, such as an electric motor, while appropriately restraining current consumption. Moreover, it is difficult to suppress play in the mechanisms involved in lowering the mirror to maintain a stabilized attitude in the stopping position of the mirror or the rigidity of each component.

SUMMARY OF THE INVENTION

It is an object of the present invention to provide a mirror operating device for a single lens reflex camera which can maintain an image stability time to perform observation or rangefinding of a subject at an upper limit.

It is another object of the present invention to effectively put to practical use the limited time per one photographic cycle from a release operation up to the end of preparation for the next photography.

It is another object of the present invention to provide a mirror operating device which prevents a lowering operation of the mirror during a photographic, operation from being coupled to a rear blind travel operation in a shutter mechanism.

Additional objects and advantages of the invention will be set forth in part in the description which follows, and, in part, will be obvious from the description, or may be learned by practice of the invention.

Objects and advantages of the present invention are achieved with a mirror operating device for a single lens reflex camera including a reflecting mirror which can move between a first position in which the reflecting mirror blocks the photographic optical path and a second position in which the reflecting mirror is aside from the photographic optical path; an electromotive drive source (hereinafter referred to as an "electromotive actuator") to drive the reflecting mirror to the first position from the second position (i.e., to perform a mirror lowering operation); a phase detection device to detect a release operation or to detect that a mechanism, which starts after the release operation, has reached a specific phase state and to output a detection signal; a mirror raising mechanism to move the reflecting mirror to the second position from the first position with a suitable drive device; a first delay device to time a first delay time and to output a first signal after the first delay time has elapsed from the output of the detection signal from the phase detection device; a second delay device to time a second delay time and to output a second signal after a second delay time has elapsed from the output of the detection signal from the phase detection device; a shutter mechanism to control opening and closing of the photographic optical path according to a release operation; and a control device to control the commencement of opening of a shutter of the shutter mechanism in response to the first signal from the first delay device and to start the electromotive actuator to drive the reflecting mirror to the first position from the second position in response to the second signal from the second delay device.

In accordance with embodiments of the present invention, the shutter of the shutter mechanism opens and closes at the end of the first delay time, and the reflecting mirror is moved from the second position to the first position at the end of the second delay time, wherein the electromotive actuator is started before finishing closing of the shutter. Further, the respective timings of the first delay time and the second delay time are set such that the reflecting mirror substantially does not obstruct the photographic optical path up to the time the closing of the shutter finishes.

The mirror operating device for a single lens reflex camera in accordance with embodiments of the present invention further includes a shutter speed setting device to set a shutter speed for performing exposure of the film surface at either an automatic setting or a manual setting. The control device controls the beginning of opening of the shutter of the shutter mechanism, and controls movement of the reflecting mirror, such that the reflecting mirror substantially does not block the photographic optical path until the closing of the shutter of the shutter mechanism finishes, even if the shutter speed changes, by adding a fixed delay time to the shutter speed set by the shutter speed setting device to obtain the second delay time.

In accordance with embodiments of the present invention, the mirror operating device of a single lens reflex camera comprises a slit exposure type shutter which travels from top to bottom of the photographic optical path. Furthermore, the reflecting mirror which blocks, or is moved aside from, the photographic optical path, moves aside from bottom to top of the photographic optical path.

In accordance with embodiments of the present invention, the starting of the respective opening and closing operations of the shutter and the lowering operation of the mirror are initiated by two delay devices which set two delay times, different from each other. The two delay times are set to start based on the signal of the phase detection device to maintain mutual operation timing at a predetermined relationship. Specifically, in accordance with embodiments of the present invention, by using the same signal as the starting point of the two delay times, the respective operations initiated at the end of the two delay times can be performed sequence at set times.

The predetermined relationship between the mutual operation timing is defined such that the lowering operation of the mirror is commenced before the finish time of shutter closing, to a degree which does not cause adverse effects on the exposure operation due to the shutter mechanism. Specifically, eclipsing of the photographic optical path by the mirror occurs to a degree which is not clearly noticed on the photographic image plane (i.e, the mirror lowering operation is performed to a degree which is not clearly noticed on the photographic image plane).

In accordance with embodiments of the present invention, the mirror lowering operation begins at an earlier time than with conventional mirror operating devices, and the end period of the lowering operation of a mirror becomes earlier by the same amount. As a result, the time which can be used for observation or rangefinding during which the mirror is in a position blocking the photographic optical path is increased, or the time per one photographic cycle comprising performing photography and photographic preparation can be shortened.

Further, to bring about correct operation even when the photographic shutter speed is changed, the delay time set by the second delay device which initiates mirror lowering is set to a sum of the shutter time corresponding to shutter speed plus a constant time, and the mirror lowering commencement time changes corresponding to the shutter speed. Further, since the finish of shutter closing changes according to the shutter speed, and because the amount of change in shutter time and the amount of change in mirror descent start time are the same, at whatever shutter speed, the above-described operation sequence and time relationship can be maintained.

Furthermore, in accordance with embodiments of the present invention, the first position of the reflecting mirror is the mirror in the lowered state blocking the photographic optical path and making viewfinder observation possible, and the second position of the reflecting mirror is the raised state aside from the photographic optical path. The reflecting mirror is movable by means of an oscillating operation between the first and second positions. A suitable drive source of the mirror raising mechanism may be, for example, a spring attached to the mirror which stores energy during mirror descent. Alternatively, the drive source of the mirror raising mechanism may be any other kind of drive source which is capable of raising the mirror. The electromotive actuator which lowers the mirror may be, for example, an electric motor, but is not limited to an electric motor.

In accordance with embodiments of the present invention, the phase detection device which detects that a mechanism which starts after a release operation reaches a specific phase state, detects, for example, that the mirror mechanism operates, that the mirror reaches the raised position, or reaches a position in the neighborhood of the raised position, but is not limited to detecting these states. The device which detects that a specific phase state has been reached from the release operation may be any type of device which operates directly in response to the signal of the release switch, or any type of device which is a combination of the mirror raising mechanism and mirror switch S1, or the release switch and the end signal of a third timer.

In accordance with embodiments of the present invention, the shutter mechanism may comprise, for example, a vertical type of focal plane shutter, but it is not limited to this type of shutter.

In accordance with embodiments of the present invention, the first and second delay devices are, for example, first and second timers included in a control circuit, but the first and second delay devices are not limited to this, and may be timing circuits separate from the control circuit.

In accordance with embodiments of the present invention, the shutter speed setting device sets shutter speed, for example, by the manual operation of a rotary dial, or automatic setting by a well known automatic exposure device.

BRIEF DESCRIPTION OF THE DRAWINGS

These and other objects and advantages of the invention will become apparent and more readily appreciated from the following description of the preferred embodiments, taken in conjunction with the accompanying drawings, of which:

FIGS. 3A–3F are timing diagrams illustrating the operation of a conventional mirror operating device.

DETAILED DESCRIPTION OF THE PREFERRED EMBODIMENTS

Figure 1:
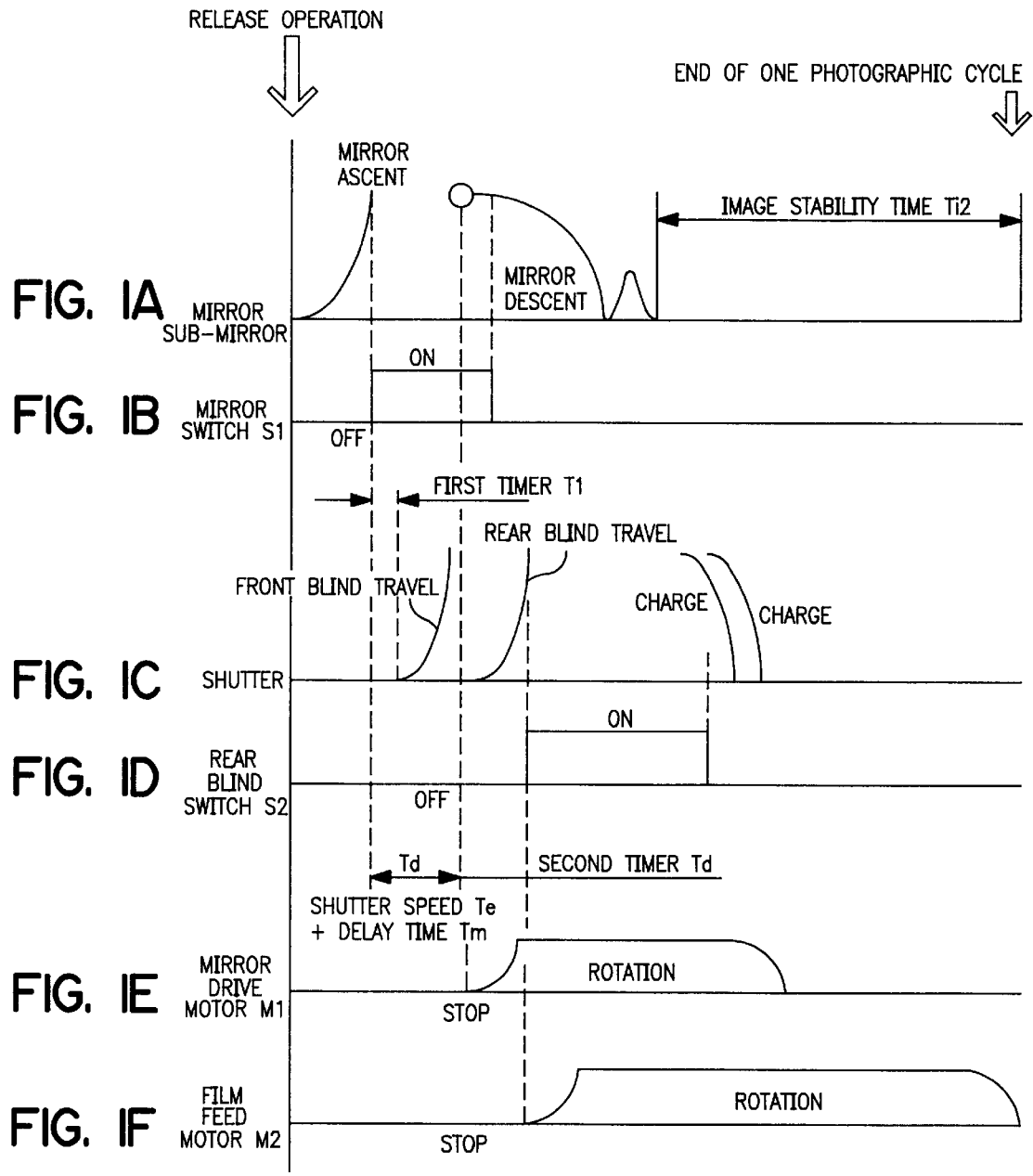
FIGS. 1A–1F are timing diagrams illustrating the operation of a mirror operating device in accordance with embodiments of the present invention.

Reference will now be made in detail to the preferred embodiments of the present invention, examples of which are illustrated in the accompanying drawings wherein like reference numerals refer to the same or similar elements throughout.

A mirror operating device for a single lens reflex camera in accordance with embodiments of the present invention will be described below with reference to FIGS. 1A–1F and FIG. 2. FIGS. 1A–1F are timing diagrams which illustrate the operation of a mirror operating device in accordance with embodiments of the present invention. FIG. 2 is a block diagram illustrating a control system for the mirror operating device in accordance with embodiments of the present invention.

As shown in FIG. 2, the control system for the mirror operating device includes a control circuit 2 to control the various mechanism units connected with a photographic process. A release device 1 is connected to the control circuit 2 and includes a release switch which is switched ON and OFF when a release button (not shown in the drawing) is operated by pressing the release button. When the release button 1 is actuated for release, an ON signal generated by the release switch is sent from the release device 1 to the control circuit 2.

A mirror starting magnet device 3 is operably connected to the control circuit 2 and receives a signal from the control circuit 2 when a release operation is performed. The mirror starting magnet device 3 causes an operation such that a reflecting mirror 8 is moved aside from the photographic optical path by a mirror operating mechanism 4. In particular, the mirror operating mechanism 4 initiates operations such as mirror ascent (also referred to as "mirror up") and mirror descent (also referred to as "mirror down" or "mirror return") between a position blocking the photographic optical path and a position aside from the photographic optical path.

As is well-known, the reflecting mirror 8 is normally in a position blocking the photographic optical path, and is stopped in a state held against the force of a spring (not shown) by the mirror starting magnet device 3. By releasing the mirror via the mirror starting magnet device 3, the reflecting mirror 8, together with a sub-mirror for autofocus (AF) use, is moved aside from the photographic optical path by the force stored in the spring. Moreover, in a normal single lens reflex camera, and in accordance with embodiments of the present invention, the upward direction is the direction which moves the reflecting mirror 8 aside from the photographic optical path.

Figure 2:
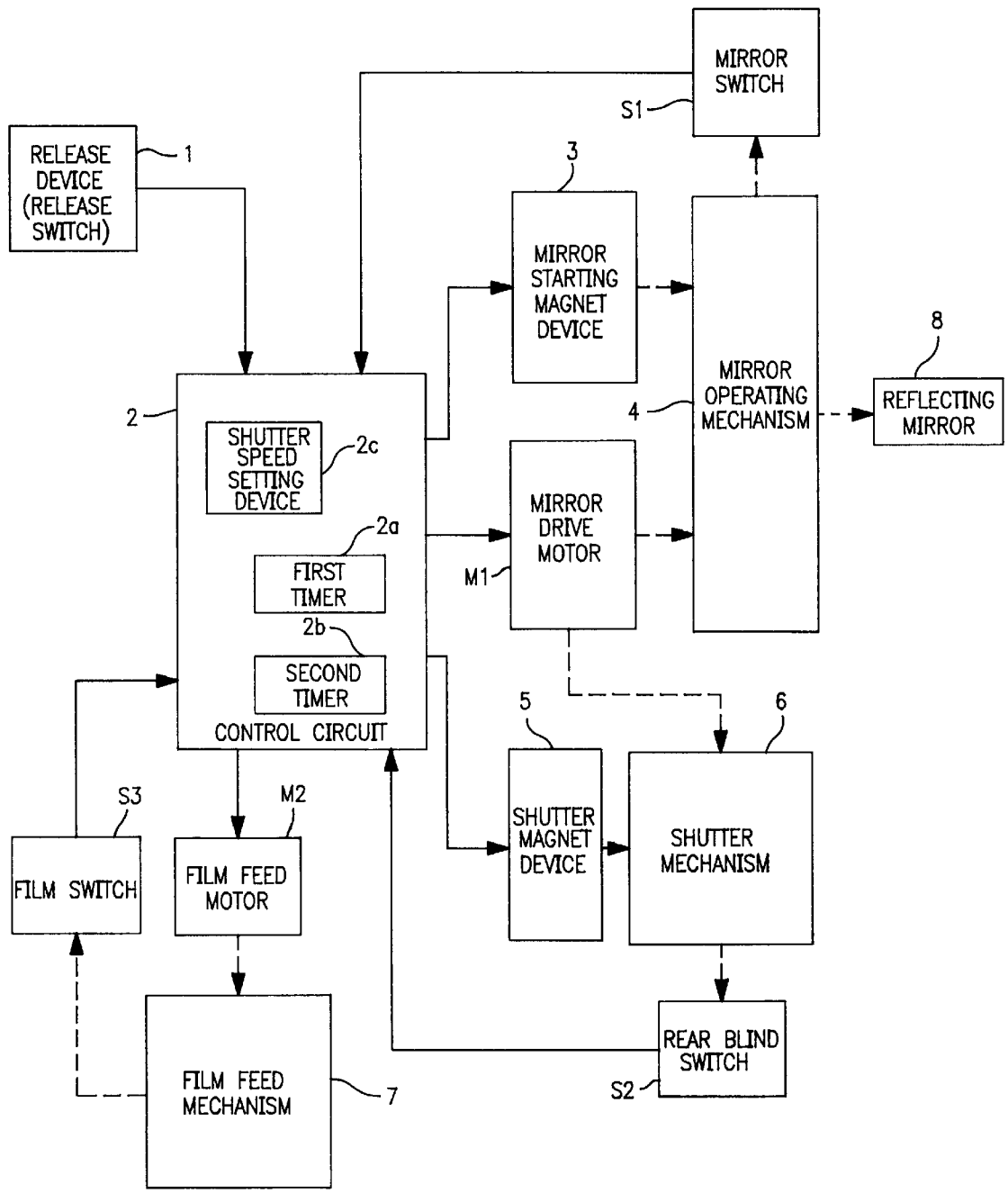
FIG. 2 is a block diagram of a control system for a mirror operating device in accordance with embodiments of the present invention.

A mirror switch S1 is disposed with respect to the reflecting mirror 8 so as to be set ON when the reflecting mirror 8 is raised by the mirror operating mechanism 4 in the neighborhood of the end of the ascent of the mirror (see FIG. 1B). When the mirror switch S1 is set ON, a first timer 2a, which is preferably part of the control circuit 2, is started, and times a previously set delay time T1.

When the first timer 2a times out, and the delay time T1 has elapsed, a shutter magnet device 5 is operated in response to the end of the delay time T1, and a front blind of the shutter mechanism 6 begins to open (FIG. 1C). In accordance with embodiments of the present invention, the shutter mechanism 6 is preferably a focal plane shutter having a front blind and a rear blind. The front blind is caused to travel by releasing a stop coupled to the release operation. Further, after a time delay corresponding to the shutter speed, which is previously set according to photometric data and the like, the rear blind is caused to travel, thus performing an exposure of the film surface. The delay time T1 set by the first timer 2a is selected to maintain sufficient time from the end of the ascent of the reflecting mirror 8 until the front bind travel of the shutter mechanism 6 such that the photographic optical path is not eclipsed by the mirror 8, and such that a large rebound, etc., of the mirror and sub-mirror has died away. Following the front blind travel, the control circuit 2 causes the shutter mechanism 6 to close, after a time delay Te corresponding to a previously set shutter speed, by operating the shutter magnet device 5. The delay time corresponding to shutter speed Te is set by the control circuit: 2. Specifically, the control circuit 2 includes a shutter speed setting device 2c, such as a well known shutter dial or automatic exposure device and the like, to set or control of the shutter speed, as necessary.

Furthermore, when the mirror switch S1 is set ON, a second timer 2b of the control circuit 2, which is separate from the first timer 2a, is started to time another delay time Td (see FIG. 1D). After the delay time Td timed by the second timer 2b has elapsed, the mirror drive motor M1 is started (FIG. 1E), arid the mirror operating mechanism 4 moves the mirror 8 and sub-mirror to the original position which blocks the photographic optical path. Specifically, the mirror 8 and sub-mirror are moved in a direction which causes the mirror 8 to descend.

Although the mirror drive motor M1 is started after the delay time Td, the rise of the mirror drive motor M1 in an instant is impossible, and the mirror 8 gradually begins to move. Moreover, with respect to the position of a mirror 8 which has risen, the mechanism to cause descent is generally separated by some interval, and provides a surplus to attain a sufficient rise. Accordingly, even though the mechanism to cause descent begins to be moved by the mirror drive motor M1, the mirror 8 and sub-mirror do not descend directly. More particularly, after the delay time Td has elapsed, the movements of the mirror 8 and sub-mirror are both interdependent, and a period of time passes until the mirror and sub-mirror begin to block a portion of the photographic optical path. The time it takes for the mirror and sub-mirror to block a portion of the photographic optical path depends on the type of mirror drive motor M1, the operating principles and the construction of the mirror operating mechanism 4, and is generally about 10–20 ms. In accordance with embodiments of the present invention, even though the photographic optical path is a little eclipsed (i.e., the mirror 8 has descended approximately 2 mm from the end of the ascent), there is no effect on the photograph taken because, in practice, the delay can be enumerated as the time up to the beginning of eclipsing and likewise of the rise, and the total rise time becomes longer.

Moreover, the signal for starting the mirror drive motor M1 is not limited to the embodiments described above, and may be some other kind of signal. For example, a further delay time may be added to the delay time Td set by the second timer 2b, and the mirror drive motor M1 is started after the end of this further delay time. The film feed motor M2 may be started at any time such that the film does not move during an exposure.

Moreover, the above-described delay time Td is defined to include a delay time corresponding to shutter speed Te and a delay time Tm (i.e., Td=Te+Tm). The delay time Td is set such that the mirror drive motor M1 is started before the closing of the rear blind of shutter mechanism 6 which operates during the shutter time Te. The delay time Tm is a fixed value which can inversely operate from the delay time Td and the delay time corresponding to shutter speed Te. For example, it is necessary to delay the commencement of descent of the mirror 8 if the shutter speed is slow (i.e., Te is relatively long). This delay amount is normally the same as the amount of change of the delay time corresponding to shutter speed Te. Accordingly, the control circuit 2 determines a necessary and sufficient delay time Tm from the characteristics of the camera operation and related camera mechanisms. However, the control circuit 2 may and also maintain the delay time Tm as a constant.

The shutter mechanism 6 is preferably the well known slit exposure vertically-running type of focal plane shutter, and may be the type which travels from above to below. Specifically, the vertically-running type of focal plane shutter operates such that the upper portion of the image plane of the mounted film ends the exposure at an early stage, and the image plane lower portion is exposed latest. Accordingly, the mirror 8, and sub-mirror descending from the camera upper portion can drop faster than a normal type of shutter, and even if the mirror more or less enters the image plane upper portion it is not an obstacle. Thus, in accordance with embodiments of the present invention, the lowering movement of the mirror can be made to end more rapidly.

However, the present invention is not limited to a vertically-running type of focal plane shutter, and the required result can, of course, also be obtained with a transverse type of focal plane shutter.

Furthermore, in accordance with the embodiments of the invention described above, the rear blind switch S2 is set ON at the end of the closing operation of the shutter mechanism 6 or slightly before the end of the closing operation of the shutter mechanism 6 (see FIG. 1D). The control circuit 2 causes the film feed motor M2 to start in response to the rear blind switch S2 being set ON, and the film feed motor M2 drives the film feed mechanism 7 (see FIG. 1F).

Further, in accordance with embodiments of the present invention, a film switch S3 may be set ON at about the time when the operation of one frame of film ends. The control circuit 2 performs control to stop the film feed motor M2 in response to the film switch.

In accordance with embodiments of the present invention, the photographic operations accompanying the release operation and photographic preparatory operations in preparation for a next operation comprise one photographic cycle.

In accordance with embodiments of the present invention, the operation timing of the mirror 8 and sub-mirror is different from that of the conventional mirror operating device, as shown in FIGS. 3A–3F, and the image stability time Ti2 becomes longer than the image stability time Ti1 shown in FIG. 3A.

The present invention is not limited to the structure which has been described above in accordance with embodiments of the invention, and the form and structure may be suitably changed and modified.

For example, the mirror operating device in accordance with embodiments of the present invention may perform only the mirror lowering operation with an electromotive drive source, and the drive source to perform the mirror raising operation may be of some other kind.

Moreover, in accordance with the embodiments of the present invention described above, the control circuit 2 comprises the first and second timers 2a, 2b. However, the present invention is not limited to this arrangement of timers, and a single timer which emits two timing signals at different times can be used.

Still further, in accordance with embodiments of the present invention, the start of delay times T1 and Td is initiated by mirror switch S1 which detects a phase of a mirror raising mechanism. However, the start of the delay times T1, Td may be initiated directly by the release signal, and not by phase detection of the mirror raising mechanism. For example, the delay time T1, Td may be started after a third delay time T3 which is initiated by the release operation.

In accordance with embodiments of the present invention, the start of the opening and closing operation of the shutter in the shutter mechanism 6, and the start of the lowering operation of the mirror, are performed at specific:

delay times set by one or two delay devices. The one or two delay devices can perform the setting of two mutually different delay times, both of which start based on the signal of the same phase detection device, or based on the release signal. Further, the one or two delay devices preserve the mutually different delay times in a predetermined relationship, while the signal which is the basis for setting the respective delay times is the same. Accordingly, the respective operations of shutter opening, mirror lowering and shutter closing can be initiated sequentially at timings which correspond to the predetermined relationship.

According to the predetermined relationship between the different delay times, the lowering operation of the mirror is commenced before the time when the shutter has finished closing, but to a degree without adverse effects on the exposure operation by the shutter mechanism 6. Specifically, the mirror descent is hastened to a degree that eclipsing of the photographic optical path is precisely not observed on the photographic image plane.

In accordance with embodiments of the present invention, the mirror descent begins at an earlier stage than in the prior art, and the end time of the lowering operation of the mirror occurs at an earlier stage by the same amount of time that the mirror descent begins earlier. Accordingly, the time used for observation or photometry of the subject via a mirror which is in a position which blocks the photographic optical path becomes increased, or the time per cycle of photography and photographic preparation can be shortened.

Further, even when the photographic shutter speed is changed to bring about correct operation, because a delay time Td for starting mirror descent set by the delay device equals a shutter time corresponding to shutter speed Te plus a constant Tm, the descent start time changes corresponding to this shutter speed. Furthermore, since the amount of change in shutter time and the amount of change in descent start time are the same, whatever the shutter speed, the operation sequence and timing relationships can be preserved.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A mirror operating device for a single lens reflex camera, comprising:

a reflecting mirror movable between a first position blocking a photographic optical path and a second position aside from the photographic optical path;

an electromotive drive source to drive the reflecting mirror from the second position to the first position;

a phase detection device to detect a release operation or to detect that a mechanism which starts after the release operation has reached a specific phase state and to output a detection signal in response to the detection;

a mirror raising mechanism to move the reflecting mirror from the first position to the second position;

a first delay device to time a first delay time starting in response to the detection signal and to output a first signal at an end of the first delay time;

a second delay device to time a second delay time starting in response to the detection signal and to output a second signal at an end of the second delay time;

a shutter mechanism to open and close the photographic optical path in response to a release operation; and a control device to control opening of the shutter mechanism in response to the first signal from the first delay device, and to start the electromotive drive source in response to the second signal from the second delay device, wherein the first signal starts opening of the shutter mechanism, and the second signal starts the electromotive drive source before the shutter mechanism is finished closing, the timing of the first delay time and the second delay time being respectively set such that the reflecting mirror substantially does not obstruct the photographic optical path until the closing of the shutter mechanism finishes.

2. A mirror operating device as recited in claim 1, further comprising:

a shutter speed setting device to set a shutter speed to perform exposure to the film surface at either automatic setting or manual setting, wherein the control device controls the movement of the reflecting mirror when the shutter speed is changed by the shutter speed setting device by setting the second delay time as the shutter speed set by the shutter speed setting device plus a fixed delay time.

3. A mirror operating device as recited in claim 1, wherein the phase detection device detects a phase state of a mirror raising mechanism which moves the reflecting mirror from the first position to the second position.

4. A mirror operating device as recited in claim 1, wherein the shutter mechanism is a slit exposure type shutter which travels from top to bottom of the photographic optical path, and the reflecting mirror moves aside from bottom to top at the photographic optical path.

5. A mirror operating device for a camera, comprising:

a mirror movable between a first position blocking a photographic optical path and a second position aside from the photographic optical path;

an electromotive actuator to drive the mirror from the second position to the first position;

a shutter mechanism to open and close the photographic optical path;

a control device to control the mirror and the shutter mechanism such that the driving of the mirror from the second position to the first position is started after the shutter mechanism is opened and before closing of the shutter mechanism is completed.

6. A mirror operating device as recited in claim 5, wherein the control device controls the mirror and the shutter mechanism such that the mirror substantially does not obstruct the photographic optical path until the closing of the shutter mechanism is completed.

7. A mirror operating device as recited in claim 5, further comprising:

a detection device to detect a predetermined state of a camera mechanism and to output a reference signal in response to detecting the predetermined state;

a first delay device to receive the reference signal from the detection device, to time a first delay time in response to receiving the reference signal and to output a first signal after elapse of the first delay time;

a second delay device to time a second delay time in response to the reference signal from the detection device, and to output a second signal after the second delay time has elapsed, wherein the control device controls opening of the shutter mechanism in response to the first signal from the first delay device, and starts the electromotive drive source in response to the second signal from the second delay device.

8. A mirror operating device as recited in claim 7, wherein the predetermined state is a release operation.

9. A mirror operating device as recited in claim 7, wherein the timing of the first delay time and the second delay time is set such that the mirror substantially does not obstruct the photographic optical path until the closing of the shutter mechanism finishes.

10. A mirror operating device as recited in claim 7, further comprising:

a shutter speed setting device to set a shutter speed, wherein the control device sets the second delay time as the shutter speed set by the shutter speed setting device plus a fixed delay time when the shutter speed is set by the shutter speed setting device.

11. A mirror operating device as recited in claim 7, wherein the shutter mechanism is a slit exposure type shutter which travels from top to bottom of the photographic optical path, and the reflecting mirror moves aside from bottom to top of the photographic optical path.

12. A mirror operating device as recited in claim 7, wherein the detection device detects a predetermined state of a mirror raising mechanism.

13. A method of operating an oscillating mirror in a camera, comprising:

raising the mirror from a first position blocking a photographic optical path to a second position aside from the photographic optical path;

initiating a shutter opening and closing operation after the mirror reaches the second position; and initiating lowering of the mirror from the second position to the first position before the shutter closing is completed.

14. A method as recited in claim 13, wherein initiating the lowering of the mirror comprises:

starting a first delay timer and a second delay timer in response to the mirror reaching a predetermined position during raising of the mirror;

initiating opening and closing of the shutter in response to the first delay timer timing out; and starting a mirror drive motor to move the mirror from the second position to the first position in response to the second delay timer timing out, the second delay timer timing out after the shutter finishes opening and before the shutter finishes closing.

15. A method as recited in claim 14, wherein the second delay timer sets a delay time as the shutter speed plus a fixed delay time.

16. A method as recited in claim 15, wherein the second delay timer sets a delay time such that the mirror does not obstruct the photographic optical path until the closing of the shutter finishes.

* * * * *